United States Patent
Schmidt et al.

(10) Patent No.: US 7,070,675 B2
(45) Date of Patent: *Jul. 4, 2006

(54) FLUOROPOLYMER FILM STRUCTURES AND LAMINATES PRODUCED THEREFROM

(75) Inventors: James John Schmidt, Getzville, NY (US); Larry Glen Snow, Leroy, NY (US)

(73) Assignee: E. I. du Pont de Nemours and COmpany, Wilmington, DE (US)

(*) Notice: Subject to any disclaimer, the term of this patent is extended or adjusted under 35 U.S.C. 154(b) by 256 days.

This patent is subject to a terminal disclaimer.

(21) Appl. No.: 10/439,462

(22) Filed: May 16, 2003

(65) Prior Publication Data

US 2003/0203190 A1    Oct. 30, 2003

Related U.S. Application Data

(62) Division of application No. 09/413,112, filed on Oct. 6, 1999, now Pat. No. 6,632,518.

(60) Provisional application No. 60/104,134, filed on Oct. 14, 1998.

(51) Int. Cl.
C09J 5/04 (2006.01)

(52) U.S. Cl. .................... 156/333; 428/335; 525/329.7

(58) Field of Classification Search .............. 156/333, 156/244.1, 1; 525/326.1, 329.7, 329.4, 329.5; 428/335

See application file for complete search history.

(56) References Cited

U.S. PATENT DOCUMENTS

| | | |
|---|---|---|
| 2,419,008 A | 4/1947 | Coffman et al. |
| 2,510,783 A | 6/1950 | Johnston et al. |
| 2,599,300 A | 6/1952 | Upson |
| 2,905,645 A | 9/1959 | Anderson et al. |
| 2,953,551 A | 9/1960 | White |
| 2,953,818 A | 9/1960 | Bartron |
| 3,133,854 A | 5/1964 | Simms |
| 3,139,470 A | 6/1964 | Prengle et al. |
| 3,264,272 A | 8/1966 | Rees |
| 3,350,372 A | 10/1967 | Anspon et al. |
| 3,404,134 A | 10/1968 | Rees |
| 3,480,580 A | 11/1969 | Joyner et al. |
| 3,481,910 A | 12/1969 | Brunson |
| 3,524,906 A | 8/1970 | Schmitt et al. |
| 4,076,698 A | 2/1978 | Anderson et al. |
| 4,351,931 A | 9/1982 | Armitage |
| 4,585,694 A | 4/1986 | Dehennau |
| 4,612,155 A | 9/1986 | Wong et al. |
| 4,751,270 A | 6/1988 | Urawa et al. |
| 4,877,683 A | 10/1989 | Bragaw, Jr. et al. |
| 4,931,324 A | 6/1990 | Ellison et al. |
| 5,028,674 A | 7/1991 | Hatch et al. |
| 5,139,878 A | 8/1992 | Kim et al. |
| 5,707,697 A | 1/1998 | Spain et al. |
| 6,632,518 B1 * | 10/2003 | Schmidt et al. ............. 428/335 |

FOREIGN PATENT DOCUMENTS

WO    WO 93/10052    5/1993

* cited by examiner

*Primary Examiner*—Richard Crispino
*Assistant Examiner*—Chris Schatz

(57) ABSTRACT

Fluoropolymer films which combine the attributes of outdoor durability, chemical resistance and thermoformability with paint-like aesthetics are formed into film structures which have at least one surface coated with a primer of amine functional polymer and an overcoat of a thermoplastic adhesive of acid modified polyolefin. Fluoropolymer films so coated are securely bonded to a variety of thermoplastic substrates forming a laminated film structure which resists delamination when exposed to moisture and humidity.

9 Claims, 1 Drawing Sheet

FLUOROPOLYMER FILM STRUCTURES AND LAMINATES PRODUCED THEREFROM

FIELD OF INVENTION

This invention relates to fluoropolymer film structures and thermoformable laminates produced therefrom.

BACKGROUND OF THE INVENTION

Fluoropolymer films have long been used as a protective and decorative overlay for a variety of substrates such as metal, wood, and thermoplastic and thermoset polymers. With its excellent chemical resistance and weathering properties, a thin layer of fluoropolymer film can protect less durable substrates from damage in both exterior and interior use. In recent years, manufacturers of automobiles, recreational vehicles, sports craft and industrial and farm equipment have begun using decorative fluoropolymer film structures to surface selected parts of vehicles and equipment in lieu of paint. Single layer polymer film and multilayer polymer films have been used. Especially useful is a laminate of a pigmented resin layer and a clear resin layer which simulates a base coat/clear coat paint appearance. Film structures of this type are often referred to as "dry paint". The use of dry paint is desirable since it avoids the need for solvents associated with conventional paint finishes. Dry paint films and laminates are especially useful for thermoformed polymeric parts, especially those with surface contours which are difficult to paint. Further, a dry paint surface allows manufacturers to use lower cost plastic substrates, which are not usable if painted by conventional means because of the unacceptable aesthetic finish that results.

Fluoropolymer films such as polyvinyl fluoride (PVF), polyvinylidene fluoride (PVDF) polymers and copolymers and blends of acrylic polymers and PVDF are often used as the decorative surface for dry paint due to their exceptional outdoor durability, chemical resistance and thermoformability. In the manufacture of parts finished with dry paint films, the film or laminate is often applied to a thermoplastic substrate which is then subjected to a thermoforming operation. A wide number of thermoplastic substrates are desirable for use such as polyolefins, polyesters, nylon, ABS, etc. However, forming a secure bond between fluoropolymer and such substrates is difficult. A bond is needed that will not delaminate after years of outdoor exposure. A manufacturing system for laminates of fluoropolymer films and thermoplastic substrates is also needed which is versatile enough to accommodate a variety of different thermoplastic materials and has a minimum number of processing steps.

U.S. Pat. No. 3,133,854 to Simms discloses a laminate structure of polyvinyl fluoride film with a variety of substrates such as metal, cellulose, cement, glass and polyvinyl chloride. The polyvinyl fluoride film is prepared by chemically activating the surface and the laminate is formed by using an intermediate layer of amine functional acrylic copolymer. However, for some thermoplastic substrates, the bond formed between the PVF layer and the substrate is weak and unsatisfactory. There is no teaching in Simms of bonding polyvinyl fluoride to polyolefin, polyamide, or polyester substrates.

U.S. Pat. No. 5,139,878 to Kim et al. discloses multilayer film structures of fluoropolymer film and thermoplastic polymer films using an intermediate adhesive layer of alkyl ester copolymers, modified polyolefins, or blends thereof. Kim's invention is aimed at producing packaging materials having good gas barrier properties and therefore the disclosure focuses on forming multilayer structures of chlorine containing fluoropolymer films adhered to polyester substrates. For some thermoplastic substrates and a number of fluoropolymer films, unsatisfactory bonds are formed using only the adhesive disclosed in this patent, especially if the laminate undergoes further forming steps.

Likewise, U.S. Pat. No. 4,585,694 to Dehennau describes multilayer structures of vinyl or vinylidene fluoride polymer and alpha-olefin polymer bonded by the joint aid of vinyl acetate polymer and a copolymer of ethylene and vinyl acetate. Laminate film structures of this type possess unsatisfactory bonds which are subject to delamination especially when further forming steps are performed. Further such bonds are considered unsuitable for long lived outdoor use.

SUMMARY OF THE INVENTION

In accordance with the present invention, a fluoropolymer film structure is provided which is particularly useful as a protective and decorative overlay for thermoplastic substrates. Employing a fluoropolymer film, the invention provides the attributes of outdoor durability, chemical resistance and thermoformability combined with paint-like aesthetics. The film structure includes at least one primer layer of amine functional polymer applied to one surface of the fluoropolymer film and at least one thermoplastic adhesive layer containing acid modified polyolefin adhered to the primed surface of the fluoropolymer film. The fluoropolymer film structure with primer and adhesive layers is advantageously used for lamination to any of a variety of thermoplastic substrates.

In a laminated film structure in accordance with the invention, the fluoropolymer film structure is adhered to the thermoplastic substrate. A secure bond forms between the fluoropolymer film structure and the thermoplastic substrate which resists delamination when exposed to moisture and humidity that attack adhesive bonds. Such laminated film structures can be produced by a simplified laminating process which decreases the heat and pressure requirements to secure a firm bond between the fluoropolymer film and a thermoplastic substrate.

Preferably, the acid modified polyolefin of the thermoplastic adhesive layer is selected from the group consisting of (1) copolymers of ethylene and at least one first comonomer of unsaturated carboxylic acid or derivative of the acid, (2) olefin polymer grafted with at least one unsaturated carboxylic acid or derivative of the acid, and (3) blends of the copolymers and the grafted olefin polymers. In addition, the copolymer preferably further comprises at least one second comonomer selected from the group consisting of alkyl esters of $\alpha,\beta$-ethylenically unsaturated carboxylic acid, vinyl esters of carboxylic acid and carbon monoxide.

The invention also provides for a process for making the laminated film structure. An amine functional polymer is deposited on a fluoropolymer film to form a primed fluoropolymer film. A layer of thermoplastic adhesive comprising acid modified polyolefin is formed on and adhered to the amine functional acrylic polymer of the primed fluoropolymer film. A thermoplastic substrate is formed and adhered to the layer of thermoplastic adhesive. In a preferred form of the invention, the adhesive layer of the laminated film is extruded onto to the primed fluoropolymer film. Most preferably, the adhesive layer and a thermoplastic substrate are coextruded onto the primed fluoropolymer film.

DETAILED DESCRIPTION

Fluoropolymer Film

Figure 1:
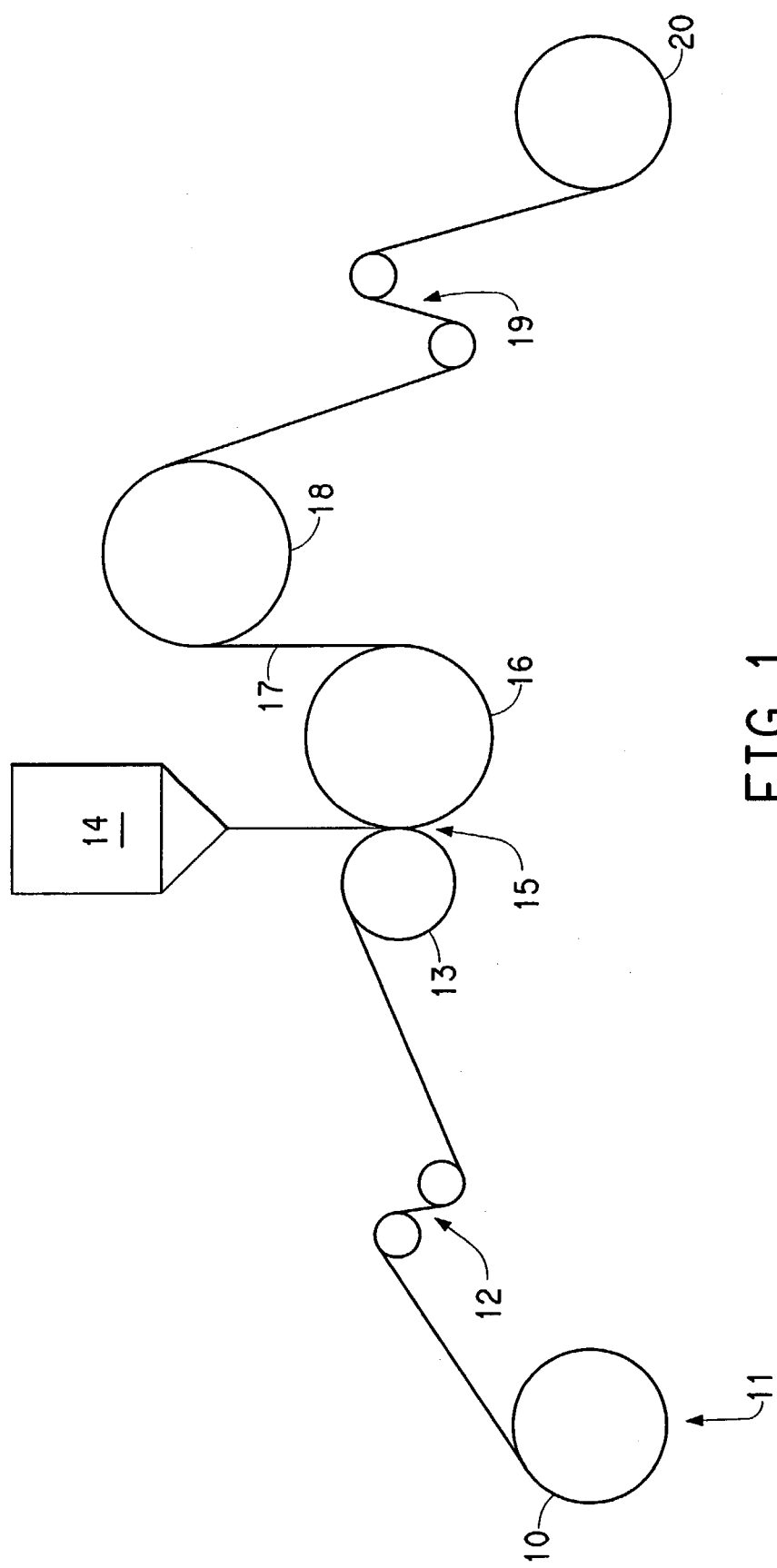
FIG. 1 is a schematic view of the extrusion equipment used to form film structures of this invention.

The present invention is applicable to a wide range of fluoropolymer films such as those prepared from polymers and copolymers of trifluoroethylene, hexafluoropropylene, monochlorotrifluoroethylene, dichlorodifluoroethylene, tetrafluoroethylene, vinylidene fluoride, vinyl fluoride, among others. For example, the fluoropolymer may be a fluorinated ethylene/propylene copolymer, i.e., FEP resins, a copolymer of ethylene/chlorotrifluoroethylene, vinylidene fluoride/hexafluoropropylene, and vinylidene fluoride/perfluoro (alkyl vinyl ether) dipolymers and terpolymers with tetrafluoroethylene, polyvinylidene fluoride homopolymer (PVDF), polyvinyl fluoride homopolymer (PVF), among others.

The present invention is preferably employed with polyvinyl fluoride (PVF) films. Other preferred films for use in the present invention are made from polyvinylidene fluoride (PVDF) or from a blend of polyvinylidene fluoride (PVDF) and acrylic polymers.

Both oriented and unoriented fluoropolymer films can be used in the practice of the present invention. For applications in which the films will be employed in laminates to be subjected to thermoforming, low orientation or unoriented films are usually desirable.

The fluoropolymer film can be made from fluid compositions which are either (1) solutions or (2) dispersions of fluoropolymer. Films are formed from such solutions or dispersions of fluoropolymer by casting or extrusion processes.

Typical solutions or dispersions for polyvinylidene fluoride or copolymers of vinylidene fluoride are prepared using solvents which have boiling points high enough to avoid bubble formation during the film forming/drying process. The polymer concentration in these solutions or dispersions is adjusted to achieve a workable viscosity of the solution and in general is less than about 25% by weight of the solution. A suitable fluoropolymer film is formed from a blend of polyvinylidene fluoride, or copolymers and terpolymers thereof, and acrylic resin as the principal components as described in U.S. Pat. Nos. 3,524,906; 4,931,324; and 5,707,697.

In the preferred form of the invention using films of polyvinyl fluoride (PVF), suitable films can be prepared from dispersions of the fluoropolymer. The nature and preparation of such dispersions are described in detail in U.S. Pat. Nos. 2,419,008; 2,510,783; and 2,599,300. Suitable PVF dispersions can be formed in, for example, propylene carbonate, N-methyl pyrrolidone, γ-butyrolactone, sulfolane, and dimethyl acetamide. The concentration of PVF in the dispersion will vary with the particular polymer and the process equipment and the conditions used. In general, the fluoropolymer will comprise from about 30 to about 45% by weight of the dispersion.

If desired, various color and opacity effects can be achieved by incorporating pigments and fillers in the polyvinyl fluoride dispersion during manufacture. Examples of pigments and fillers are metallic oxides, hydroxides, chromates, silicates, sulfides, sulfates, and carbonates, organic dyes and carbon blacks.

Films of polyvinyl fluoride may be formed by extrusion procedures such as those described in U.S. Pat. Nos. 3,139,470 and 2,953,818. These patents describe the feeding of polyvinyl fluoride dispersion to a heated extruder which is connected to a slotted casting hopper. A tough coalesced extrudate of polyvinyl fluoride is extruded continuously in the form of a film containing latent solvent. The film can be merely dried or, alternately, can be heated and stretched in one or more directions while the solvent is volatilized from the film. When stretching is used, oriented film is produced. Alternatively, films of polyvinyl fluoride can be cast from dilute dispersions of the polymer in latent solvent. Cast, multilayer polyvinyl fluoride structures as those described in U.S. Pat. No. 4,877,683 may also be used in place of a single film of PVF.

In fluoropolymer film casting processes, the fluoropolymer is formed into its desired configuration by casting the dispersion onto a support, by using any suitable conventional means, such as spray, roll, knife, curtain, gravure coaters, or any other method that permits applying a substantially uniform film without streaks or other defects. The thickness of the cast dispersion is not critical, so long as the resulting film has sufficient thickness to be self-supporting and be satisfactorily removed from the substrate onto which the dispersion is cast. In general, a thickness of at least about 0.25 mil (6.4 µm) is satisfactory, and thicknesses of up to about 15 mils (381 µm) can be made by using the dispersion casting techniques of the present invention. A wide variety of supports can be used for casting films according to the present invention, depending on the particular polymer and the coalescing conditions. The surface onto which the dispersion is cast should be selected to provide easy removal of the finished film after it is coalesced. While any suitable support can be employed for casting the fluoropolymer dispersion, examples of suitable supports include polymeric films or steel belts. Examples of polymeric films which may be used as a support include films comprising polyimides, polyarylates, polyesters, among others. Smooth, oriented films polyethylene terephthalate has been found to be particularly useful for casting films with good gloss and high DOI when a decorative surface for automobile parts and the like are desired. For other applications, such as the interiors of aircraft or seats for mass transit vehicles, textured supports may be used to cast polymeric films so that the cast films provide a matte or textured appearance.

After casting the fluoropolymer dispersion onto the support, the fluoropolymer is then heated to coalesce the fluoropolymer into a film. The conditions used to coalesce the polymer will vary with the polymer used, the thickness of the cast dispersion, among other operating conditions. Typically, when employing a PVF dispersion, oven temperatures of from about 340° F. (171° C.) to about 480° F. (249° C.) can be used to coalesce the film, and temperatures of about 380° F. (193° C.) to about 450° F. (232° C.) have been found to be particularly satisfactory. The oven temperatures, of course, are not representative of the temperatures of the polymer being treated, which will be lower. After coalescence, the finished film is stripped from the support by using any suitable conventional technique.

Each surface of the fluoropolymer film which is to be coated with the primer of this invention is preferably activated. That is, the surface is made receptive by forming functional groups of hydroxyl, carboxyl, carbonyl, amino, amido, or ethylenically unsaturated radicals on the surface. The activation can be achieved by exposing the film to a gaseous Lewis acid, to sulfuric acid or to hot sodium hydroxide. Preferably, the surface can be activated by exposing one or both surfaces to an open flame while cooling the opposite surface. Activation can also be achieved by subjecting the film to a high frequency, spark discharge such as corona treatment.

Primer Layer

According to this invention, a primer layer of an amine functional polymer is deposited on the fluoropolymer film which preferably has been activated to improve adhesion. Preferably, this is accomplished by coating at least one surface of the film with a solution of the amine functional polymer to form a layer, when dried, of from 1–50 μm thick, more preferably 2.5–8 μm thick, of amine functional polymer. The coated fluoropolymer film is passed through an oven of approximate temperature of from 100 to 300° F. (38 to 149° C.) which dries the adhesive to form a primed film and thereby confers ease of handling, in that the primed film can be rolled and stored or shipped if desired.

The amine functional polymers useful for this invention may include but are not limited to acrylic polymers, polyamides, polyurethanes, polyesters, polyaziridines, and epoxy polymers. One preferred form of the amine functional polymer is an amine functional acrylic copolymer described in U.S. Pat. No. 3,133,854 to Simms. These amine functional acrylic copolymers comprise a vinyl addition polymer having substituents each bearing a hydroxyl radical and an amino radical bonded to adjacent carbon atoms. The amino radical bears at least one active hydrogen atom and the amino radicals in the substituents contain from 0.01 to 1.0% amino nitrogen based on the weight of the polymer. Preferably, such vinyl addition polymers are prepared by copolymerizing one or more ethylenically unsaturated monomers with a small portion of monomer containing pendent epoxy substituents, for example, by well known methods of bulk, solution, emulsion or granular polymerization in the presence of free radical catalysts. The resulting copolymer is then reacted with ammonia or a primary monoamine to yield the polymers used herein. Alternately, ammonia or a primary monoamine can be reacted with an ethylenically unsaturated monomer containing a pendent epoxy substituent and the resulting ammoniated or aminated monomer copolymerized with another, and epoxy-free, vinyl monomer.

Examples of vinyl monomers which can be used as the major constituent of the vinyl polymers used in the adhesive compositions of this invention are derivatives of alpha, beta-unsaturated acids including methyl acrylate, ethyl acrylate, cyclohexyl acrylate, benzyl acrylate, naphthyl acrylate, octyl acrylate, tertiary-butyl acrylate, methyl methacrylate, ethyl methacrylate, butyl methacrylate, octyl methacrylate, stearyl methacrylate, butyl ethacrylate, ethyl alpha-chloroacrylate, ethyl alpha-phenylacrylate, dimethyl itaconate, ethyl alpha-methoxy acrylate, propyl alpha-cyanoacrylate, hexyl alpha-methylthioacrylate, cyclohexyl alpha-phenylsulfonyl acrylate, tertiarybutyl ethacrylate, ethyl crotonate, 2-hydroxypropyl acrylate, 2-hydroxypropyl methacrylate, 2-hydroxyethyl acrylate, 2-hydroxyethyl methacrylate, n-butyl acrylate, 2-ethylhexyl acrylate, 2-ethylhexyl methacrylate, lauryl acrylate, lauryl methacrylate, dimethyl maleate, isopropyl cinnamate, butyl beta-methoxyacrylate, cyclohexyl beta-chloroacrylate, acrylamide, alpha-phenylacrylamide, methacrylamide, N,N-dimethylacrylamide, N-cyclohexylmethacrylamide, itaconamide, acrylonitrile, crotonitrile, alpha-chloroacrylonitrile, methacrylonitrile, alpha-phenylacrylonitrile, N-phenyl maleimide, N-butyl itaconimide and mixtures thereof; vinyl derivatives such as vinyl acetate, vinyl benzoate, vinyl pimelate, vinyl stearate, vinyl methyl ether, vinyl butyl either, vinyl phenyl sulfide, vinyl dodecyl sulfide, vinyl butyl sulfone, vinyl cyclohexyl sulfone, vinyl chloride, vinyl fluoride, N-vinyl benzenesulfonamide, N-vinyl acetamide, N-vinyl caprolactam, styrene and vinyl toluene; allyl derivates such as allyl phenyl ether, allyl cyclohexylacetate. N,N-dimethylallylamine, ethyl allyloxyacetate, allylbenzene, allyl cyanide and allyl ethyl sulfide; methylene type derivates such a diethyl methylenemalonate, diketene, ethylene glycol ketene acetal, methylene cyclopentane, vinylidene chloride and vinylidene disulfones; miscellaneous compounds such as vinylene carbonate, acrolein acetals, methyl vinyl ketones, vinyl phosphonates, allyl phosphonates, vinyl trialkoxysilanes; and mixtures thereof. Of the aforementioned, epoxy-free vinyl monomers, acrylic esters, particularly esters of acrylic and methacrylic acids with 1 to 8 carbon-atom alkyl-, aryl- or cyclo-aliphatic alcohols are preferred. Polymers containing at least 25% by weight of methyl methacrylate can be readily and cheaply prepared, are easy to use on conventional equipment and have a good combination of adhesive and cohesive strength and weather-resistance.

Epoxy containing monomers that can be used in forming the primer composition are for example glycidyl methacrylate, glycidyl acrylate, allyl glycidyl ether, butadiene monoepoxide, vinyl-cyclohexene epoxide, glycidyl oxyethyl vinyl sulfide, glycidyl sorbate, glycidyl ricinoleate, glycidyl vinyl phthalate, glycidyl allyl phthalate, glycidyl allyl maleate, glycidyl vinyl ether, allyl alpha, beta-epoxyisovalerate and mixtures thereof. Glycidyl acrylate and methacrylate are particularly preferred because they can be copolymerized readily in small controlled amounts and the epoxy group introduced thereby reacts readily and substantially completely with ammonia and amines.

In the alternative, amine functional acrylic copolymers are formed by using acrylic acid or methacrylic acid in place of the epoxy containing monomers and reacting the acid with aziridine to form a primary amine, preferably ethylene imine or propylene imine.

For the purposes of this invention, amine functional copolymers are preferred, particularly primary amine functional acrylic copolymers, specifically monoalkyl amines of $C_8$ or less. Especially preferred for this invention are primary amine functional acrylic copolymers. For example, methyl methacrylate/butyl methacrylate/glycidyl methacrylate (32.5/64.0/3.5) is post reacted with ammonia to produce a primary amine functional acrylic copolymer and methyl methacrylate/glycidyl methacrylate (98/2) is post reacted with ammonia to produce a primary amine functional acrylic copolymer.

Suitable solvents for application of the amine functional polymer to the fluoropolymer film are any of a variety of volatile solvents such as toluene, xylene, butanol, pentanol, isopropanol, cyclopentane, octane, ethoxythanol, and other aliphatic, cycloaliphatic, and aromatic hydrocarbons, alcohols, ethers and mixtures thereof. Concentration of the amine functional polymers in such solutions is usually about 10% to about 40% by weight. Any of a variety of coating methods may be used including, for example, spraying, dipping, roll coating, etc.

Thermoplastic Adhesive Layer

The thermoplastic adhesive layer is applied over the primed surface of the fluoropolymer film. The adhesive layer composition contains an acid modified polyolefin. Suitable acid modified polyolefin adhesives are sold by The DuPont Company under the trademark BYNEL®. In a preferred embodiment of the invention, the acid modified polyolefin is selected from the group consisting of (1) copolymers of ethylene and at least one first comonomer of unsaturated carboxylic acid or derivative of the acid, (2) olefin polymer grafted with at least one unsaturated carboxylic acid or derivative of the acid, and (3) blends of the copolymers and the grafted olefin polymers.

When the acid modified polyolefin is a copolymer of ethylene and at least one first comonomer of unsaturated carboxylic acid or derivative of the acid preferred unsaturated carboxylic acids for this invention include α,β-ethylenically unsaturated carboxylic acids and their derivatives such as corresponding anhydrides, esters or half esters, amides, imides and metal salts. Most preferably, C3–C8 α,β-ethylenically unsaturated carboxylic acids and their derivatives are used. Representative acids for the first comonomer of this invention include acrylic acid, methacrylic acid, maleic acid, and corresponding derivatives.

The ethylene copolymer composition of this invention can be produced by direct copolymerization of ethylene and unsaturated carboxylic acid in accordance with the processes known to the art. By "direct copolymerization", it is meant that the copolymer is made by polymerization of monomers together at the same time, as distinct from a "graft copolymerization" where a monomer is attached or polymerized onto an existing polymer chain. Methods of preparing such ethylene-acid copolymers are well known and are described in U.S. Pat. Nos. 4,351,931; 3,264,272; and 3,404,134. Ethylene-acid copolymers with high levels of acid are difficult to prepare in continuous polymerizers because of monomer-polymer phase separation. This difficulty can be avoided however by use of "cosolvent technology" as described in U.S. Pat. No. 5,028,674 or by employing somewhat higher pressures than those at which copolymers with lower acid can be prepared.

The preferred copolymer composition comprises between about 0.001 and about 10 weight % of the unsaturated carboxylic acid or its derivative, based on the total weight of the copolymer. More preferably, the unsaturated carboxylic acid or its derivative comprises between about 0.005 and about 5 weight %; most preferably, between about 0.01 and about 2 weight %.

According to this invention, the acid modified polyolefin may be a copolymer of ethylene which further comprises in addition to the at least one first comonomer of unsaturated carboxylic acid or derivative of the acid, at least one second comonomer selected from the group consisting of alkyl esters of α,β-ethylenically unsaturated carboxylic acid, vinyl esters of a carboxylic acid and carbon monoxide.

The alkyl esters of an α,β-ethylenically unsaturated carboxylic acid preferably have the following formula:

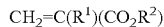

$$CH_2=C(R^1)(CO_2R^2)$$

wherein $R^1$ is H or an alkyl group having 1 to 5 carbon atoms, and $R^2$ is H or an alkyl group having 1 to 12 carbon atoms.

Alkyl ester copolymers can be produced in accordance with the processes well known to the art forming random, block and graft copolymers. Those production processes include, but are not limited to the ones described in U.S. Pat. No. 2,953,551 to White and U.S. Pat. No. 3,350,372 to Anspon. As disclosed in U.S. Pat. No. 3,350,372, alkyl ester copolymers can be prepared by a continuous polymerization of ethylene and an alkyl ester of an α,β-ethylenically unsaturated carboxylic acid in the presence of a free radical polymerization initiator such as lauroyl peroxide or capryl peroxide.

The alkyl esters of an α,β-ethylenically unsaturated carboxylic acid which may be used to form the alkyl ester copolymers include, but are not limited to, methyl acrylate, ethyl acrylate, butyl acrylate, 2-ethylhexyl acrylate, decyl acrylate, octadecyl acrylate, methyl methacrylate, ethyl methacrylate, butyl methacrylate, 2-ethylhexyl methacrylate, decyl methacrylate, and octadecyl methacrylate.

Examples of preferred alkyl ester copolymers suitable for use in the present invention include ethylene/methyl acrylate, ethylene/ethyl acrylate, ethylene/butyl acrylate, ethylene/2-ethylhexyl acrylate, ethylene/decyl acrylate, ethylene/octadecyl acrylate, ethylene/methyl methacrylate, ethylene/ethyl methacrylate, ethylene/butyl methacrylate, ethylene/2-ethylhexly methacrylate, ethylene/decyl methacrylate, ethylene/octadecyl methacrylate, and copolymers and blends thereof. The preferred alkyl ester copolymer suitable for the present invention comprises between about 5 and about 50 weight % of the alkyl ester, based on the total weight of the alkyl ester copolymer. More preferably, the alkyl ester comprises between about 5 and about 40 weight %; most preferably, between about 10 and about 30 weight %.

The alkyl ester copolymers contain up to 5 weight percent, preferably up to 3 weight percent, more preferably up to 1 weight percent, of unsaturated carboxylic acids and their derivatives.

The second comonomer may also be a vinyl ester of carboxylic acid. Representative acids include acetic acid, pivalic acid and versatic acid. Or, the second comonomer may be carbon monoxide.

According to this invention, the acid modified polyolefin may alternately be an olefin polymer grafted with at least one unsaturated carboxylic acid or derivative of said acid. The olefin polymer compositions suitable for grafting includes a homopolymer of an olefin monomer containing 2–8 carbon atoms; or a copolymer of a ethylene and a comonomer selected from the group of $C_3$–$C_{10}$ alpha olefin monomer, or an alkyl ester of α,β-ethylenically unsaturated carboxylic acid, vinyl ester of carboxylic acid and carbon monoxide. Examples of suitable polyolefins include low, medium or high density polyethylene, linear low density polyethylene, polypropylene, polybutylene, polypentene-1, poly-3-methylbutene-1, poly-4-methylpentene-1, polyhexene-1, and copolymers and blends thereof. Of these, preferred polyolefins are polyethylenes, polypropylene, polybutylene, and copolymers such as ethylene/vinyl acetate, ethylene/methyl acrylate and blends thereof. The olefin polymer can be produced by well known processes. Generally, moderately low pressures are employed using as catalyst the reaction product of a transition metal salt, usually a chloride of titanium, vanadium or zirconium or vanadium oxychloride, partially reduced with an organometallic aluminum or magnesium compound or a Grignard reagent. These polymerizations may be conducted at temperatures above 130° C. in solution or as slurries in a diluent at lower temperatures. Such methods are described in U.S. Pat. Nos. 4,076,698 and 2,905,645 as well as in several patents to Karl Ziegler and his associates.

The olefin polymer of the present invention is grafted with at least one unsaturated carboxylic acid or derivative of the acid. Preferred carboxylic acids for this invention include α,β-ethylenically unsaturated carboxylic acids and their derivatives such as corresponding anhydrides, esters or half esters, amides, imides and metal salts. Representative acids for producing the grafted olefin polymer of this invention include acrylic acid, methacrylic acid, maleic acid, fumaric acid, citraconic acid, crotonic acid, itaconic acid, succinic acid, muconic acid and corresponding derivatives, such as maleic anhydride, citraconic anhydride, itaconic anhydride and the like. Preferred of these are anhydrides, of which most preferred is maleic anhydride.

The preferred grafted olefin polymer composition comprises between about 0.001 and about 10 weight % unsaturated carboxylic acid or its derivative, based on the total weight of the olefin graft polymer. More preferably, the unsaturated carboxylic acid or its derivative comprises between about 0.005 and about 5 weight %; most preferably, between about 0.01 and about 2 weight %.

The grafted olefin polymer compositions suitable for the present invention can be produced in accordance with the processes known to the art, including but not limited to the processes described in U.S. Pat. Nos. 3,481,910; 3,480,580; 4,612,155 and 4,751,270. As a suitable process, a graft polymerization reaction is generally performed by standard graft polymerization techniques known in the art. Such a process comprises heating a mixture of a polyolefin, the unsaturated carboxylic acid or derivative of the acid and a free radical initiator under kneading to a temperature at which polyolefin becomes molten to facilitate graft polymerization of the functional moiety. Alternatively, the above-stated compounds are dissolved or suspended in an appropriate solvent to perform the graft polymerization reaction.

Further according to this invention, the acid modified polyolefin may be a blend of the ethylene copolymers as described above and the grafted olefin polymers as described above.

The thermoplastic adhesive containing acid modified polyolefin, whether ethylene copolymers, grafted olefin polymers or a blend of the two, may further comprise an unmodified polyolefin. An unmodified polyolefin is defined as (1) a polyolefin which has no comonomer of unsaturated carboxylic acid or derivative of the acid and (2) no grafted unsaturated carboxylic acid or derivative of the acid. Examples of suitable unmodified polyolefins include low, medium or high density polyethylene, linear low density polyethylene, polypropylene, polybutylene, polypentene-1, poly-3-methylbutene-1, poly-4-methylpentene-1, polyhexene-1, and copolymers, such as ethylene vinyl ester copolymers, and blends thereof. Of these, preferred polyolefins are polyethylenes, polypropylene, polybutylene, and ethylene vinyl acetate copolymer and blends thereof. Such unmodified polyolefins may be present in the amount of up to 85 weight % of the total weight of modified polyolefin and unmodified polyolefin.

The acid modified polyolefin compositions may advantageously contain up to about 40 weight % of at least one elastomer such as ethylene/propylene rubber, ethylene/1-butene rubber, butyl rubber, butadiene rubber, styrene/butadiene rubber, ethylene/butadiene rubber, isoprene rubber, isobutylene or the like. Such elastomers may also be modified with a constituent having a functional moiety selected from the group consisting of unsaturated carboxylic acids and acid anhydrides thereof in accordance with the method described above in conjunction with grafted olefin polymer.

The acid modified polyolefin compositions of the present invention may advantageously contain up to about 35 weight % of at least one tackifying resin. Suitable resins are described in WO 93/10052. Suitable tackifying resins may include (i) alicyclic or aliphatic hydrocarbon resins; (ii) aromatic hydrocarbon resins; (iii) rosin and rosin derivatives; and (iv) terpene resins; or mixtures thereof.

The acid modified polyolefin compositions may also contain small amounts of conventional additives such as antioxidants, slip additives, processing aids, UV stabilizers, anti-block agents, pigments and colorants. The amount contained is small enough so as to not interfere with the formation of durable bonds.

Laminate Film Structures

Film structures comprising primed fluoropolymer film overcoated with at least one layer of thermoplastic adhesive containing acid modified polyolefin may be adhered to a variety of thermoplastic substrates to form laminated film structures suitable for further forming operations. A wide number of thermoplastic materials are desirable for use as substrates such as polyolefins, polyesters, polyamides, polyvinyl chloride, polycarbonates and ABS (acrylonitrile/butadiene/styrene). Of particular interest are polyolefins, e.g., polypropylene, polyethylene, polyamides, e.g., nylon 6, nylon 6,6, and polyesters, e.g., polyethylene terephthalate. However, in the past it has been difficult to form a secure bond between a fluoropolymer film and a substrate of polyolefin, polyamide, or polyester, especially a bond that will withstand a subsequent thermoforming operation and not delaminate under the rigor of outdoor exposure. Also of particular interest are filled compositions such as glass reinforced thermoplastics that, if painted, produce an unacceptable, rough surface finish. Film structures of the present invention form laminate structures particularly with polyolefins, polyamides or polyesters and provide smooth surfaces that resist delamination under harsh weather conditions for prolonged periods of time.

Process

Film structures of this invention are made by first depositing an amine functional polymer on a fluoropolymer film to form a primed fluoropolymer film. A layer of thermoplastic adhesive of acid modified polyolefin is formed and adhered to the primed fluoropolymer film. A preferred process for forming film structures of this invention is shown in FIG. 1.

Fluoropolymer film 10 primed with amine functional polymer is placed upon unwind station 11 so that acrylic primer is facing up as the film moves toward tension control rolls 12. The film then passes over a backup roll 13 which may be temperature controlled to heat the film prior to contact with the thermoplastic adhesive melt leaving the extruder die 14. Adjustment of the gap 15 between the backup roll 13 and the primary chill roll 16 can be used to help control thickness. The just formed film structure 17 then passes over a secondary chill roll 18 through a second tension control zone 19 and onto a wind up 20.

The temperatures of the backup roll 13 and primary and secondary chill rolls 16 and 18 along with line speed can be manipulated to control the bond quality. This must be balanced against the chill rolls' function of solidifying the extrudate and will depend therefor upon the specific material being extruded. The line speed will vary so as to control the thickness of the melt being extruded. The temperature of operation during forming and adhering the layer of thermoplastic adhesive to the thermoplastic substrate is preferably less than 600° F. (316° C.). In general, the temperature used to extrude a layer of thermoplastic adhesive is chosen so as to achieve desired melt flow characteristics, most preferably in the range of 450–550° F. (232–288° C.). Film structures prepared from primed fluoropolymer film and overcoated with thermoplastic adhesive can be used as roll stock and laminated to thick thermoplastic sheet in a roll lamination process or in a platen press. Laminated film structures can also be formed by extruding a thermoplastic substrate onto the film structure.

In a preferred process, the laminated film structure is prepared by coextrusion of the thermoplastic adhesive layer with the thermoplastic substrate. For processes that involve coextrusion, that is, extruding the thermoplastic adhesive together with one or more thermoplastic layers that function as thermoplastic substrates, a coextrusion die may be used. A die of this type is capable of receiving two or more molten polymer feeds and depositing layers of such polymers of the desired thickness onto the adhesive coated fluoropolymer film. Coextrusion permits the formation of laminate film structures with fewer processing steps when compared to other hot assembly methods, i.e., formation and adherence of both the thermoplastic adhesive layer and the thermoplastic substrate to the primed fluoropolymer is achieved at the same time without the need for separate coating and lamination steps. Coextrusion permits regulation of heat, pressure, line speed, dwell time in forming secure, enduring bonds with selected thermoplastic substrates.

Film structures and laminated film structures of this invention can be formed into shaped parts or articles by methods well known in the art such as form-in-place molding, differential vacuum forming, and insert injection molding. Such film structures can be thermoformed by placing a flat film structure into an injection mold and injecting molten plastic behind the film causing the film structure to take the shape of the injection mold (form-in-place molding). Or, laminated film structures can be thermoformed into shells and used in insert injection molding processes where molten plastic resin is introduced behind the shell. FRP techniques (fiber glass reinforced panel) are also suitable.

Alternatively, the process described above may be used to make thick film structures, e.g., 50 mils (1.7 mm) or greater. These thick sheets can be thermoformed directly into final parts without requiring further lamination to a supporting thermoplastic substrate or without injection molding.

The above described invention is particularly useful as a dry paint for surfaces and selected parts of automobiles, recreational vehicles, sports craft and industrial and farm equipment. The invention is especially well suited for the manufacture of parts when they are thermoformed articles. However, the subject matter of the instant invention has many other applications. Some of such applications include aircraft decorative laminates, graffiti-resistant coverings for interior or exterior architectural paneling and flexible fabrics, and UV-resistant protective coverings for numerous thermoplastic and thermoset surfaces and parts where weathering or chemical resistance is of concern. The invention has particular utility for surfacing marine vehicles, water skis and the like where there is constant exposure to a water environment.

Test Methods

Bond Strength

Bond strength of laminated film structures is determined by subjecting the laminate to ASTM D1876-93 for Peel Resistance of Adhesives (T-Peel Test). The analysis is performed on a Model 4201 Instron with a two inch cross head separation. The relative humidity of the room is not controlled and the temperature of the room is maintained at 70°±5° F. (21°±3° C.). Five test specimens are tested for each construction. Samples are bonded over six inches of their length. The load is applied at a constant speed of 2 in/min (5 cm/min) and the peak load is recorded.

Bond strength is measured for dry and wet laminate structures. If "wet", the test is performed after 18 hours of soaking in water at 80° C. Bond failures were rated qualitatively with a rating system of 1 through 4 with a rating of 4 being the best adhesion rating. A rating of 1 is given to samples demonstrating an adhesive failure that resulted in the film peeling very easily. A rating of 2 is given to samples which exhibited an adhesive failure that required significant effort to peel the film. A rating of 3 is given to samples which failed by peeling, but resulted in significant elongation of the film or elongation of the film followed by tearing of the film. A rating of 4 is given to samples which demonstrated a film break at the glue line or film elongation followed by a break at the glue line.

Weathering Test

Accelerated weathering performance of film structures and laminates formed from the film structures is determined in accordance with SAE J1960 using a xenon arc accelerated weathering apparatus available form the Atlas Company, Chicago, Ill.

EXAMPLES

The materials used for the following examples and the abbreviations used in the tables are as follows:

Fluoropolymer Film

PVF-1=Cast, green polyvinyl fluoride film 1.5 mils (38.1 μm) thick corona treated, available as TEDLAR® AG15AH8 from The DuPont Company, Wilmington, Del.

PVF-2=Cast, black polyvinyl fluoride film 1.5 mils (38.1 μm) thick corona treated, available as TEDLAR® BA15AH8 from The DuPont Company, Wilmington, Del.

PVF-3=Cast, white polyvinyl fluoride film 1.5 mils (38.1 μm) thick corona treated, available as TEDLAR® AW15AH8 from The DuPont Company, Wilmington, Del.

PVDF=Cast, polyvinylidene fluoride film (100% PVDF) 0.5 mils, (12.7 μm), from Avery Dennison, Pasadena, Calif.

Primer

P1=methyl methacrylate/butyl methacrylate/glycidyl methacrylate (32.5/64.0/3.5) post reacted with ammonia to convert the glycidyl groups into 2-hydroxy-3-aminopropyl groups to produce a primary amine functional acrylic copolymer in a solvent of toluene, isopropanol, and xylene which is available commercially as acrylic adhesive 68040 from The DuPont Company, Wilmington, Del.

P2=methyl methacrylate/glycidyl methacrylate (98/2) post reacted with ammonia to convert the glycidyl groups into 2-hydroxy-3-aminopropyl groups to produce a primary amine functional acrylic copolymer in a solvent of toluene and isopropanol which is available commercially as acrylic adhesive 68080 from The DuPont Company, Wilmington, Del.

Thermoplastic Resin

PP =polypropylene, ESCORENE® 5232, available from Exxon Corporation, Houston, Tex.

PE =polyethylene, ALATHON® 1640, available from Lyondell Petrochemicals Company, Houston, Tex.

N-1=nylon 6,6, ZYTEL® 42A available from The DuPont Company, Wilmington, Del.

N-2=nylon 6,12, ZYTEL® 360 PHS, available from The DuPont Company, Wilmington, Del.

PT=modified polyester copolymer resin SELAR® PT 8307, available from The DuPont Company, Wilmington, Del.

Adhesives

The composition of the acid modified polyolefin adhesives used is listed in each of the examples. The following abbreviations are used.
MP=melting point of adhesive
VICAT=softening temperature of adhesive
MI=melt index of adhesive
All percents are by weight.

Example 1

The good primer/adhesive bonds provided by the present invention are illustrated by making PVF/primer/adhesive/primer/PVF laminates. This structure allows for the use of lab heat sealing equipment without sticking to the jaws or incorporating some other release layer. In addition, this structure also illustrates the strength of the primer/adhesive interface under varying conditions.

Cast, corona treated PVF-1 film is primed with an amine functional acrylic polymer (P2) by solvent casting. Thermoplastic adhesive of acid modified polyolefin as indicated in Table 1 below is applied to a first layer of the primed PVF-1 film. A second layer of the same primed PVF-1 film is applied over the adhesive to form a sandwich structure of PVF/primer/adhesive/primer/PVF.

The laminate structure is subjected to heat sealing by placing the sandwich between two preheated metal bars initially in noncontacting relationship to the bars. The bars are subsequently pneumatically activated so that they pinch the sandwich structure for a desired amount of time (dwell time) and predetermined pressure. In this example the bars are operated at an air pressure of 60 psi (415 kPa) with a sealing pressure of 376 lbs (171 kg) on a 1 inch (2.5 cm) wide sample. Dry and wet bonds are characterized by what load in grams are required to force a 1 inch (2.5 cm) wide sample to peel or for one layer of the sandwich to yield in some way. Bond failures are characterized with the rating system described above.

Results are summarized in Tables 1 and 2 for samples which are either dry or wet, and vary in heat seal temperature and dwell time. Good bond development is apparent even with low dwell times and even after water immersion. Bonds have sufficient strength such that when there is an attempt to force delamination, the film breaks in lieu of the bond giving. Further the ability for such bonds to withstand moisture and humidity is demonstrated by the strength of the bond even after soaking.

TABLE 1

HEAT SEAL TESTING - PVF/PRIMER/ADHESIVE/PRIMER/PVF
ADHESIVE = Blend of:
(1) 64.7% copolymer of ethylene and 28% vinyl acetate
(2) 20% copolymer of ethylene and 28% vinyl acetate grafted with maleic anhydride
(3) 15% hydrocarbon tackifier
(4) 0.3% amide slip additive

| | | Heat Seal Bar Temperature | | | | | | | |
|---|---|---|---|---|---|---|---|---|---|
| | | 180° C. | | 180° C. | | 200° C. | | 200° C. | |
| Sample # | Dwell Time (sec) | Dry (g/cm) | Failure (1–4) | Wet (g/cm) | Failure (1–4) | Dry (g/cm) | Failure (1–4) | Wet (g/cm) | Failure (1–4) |
| 1-1 | 5 | 1303 | 4 | 1815 | 4 | 1598 | 4 | 1378 | 4 |
| 1-2 | 15 | 1370 | 4 | 783 | 4 | 1646 | 4 | 1689 | 4 |
| 1-3 | 30 | 1295 | 4 | 1618 | 4 | 1185 | 4 | 858 | 4 |
| 1-4 | 45 | 1189 | 4 | 1535 | 4 | 1492 | 4 | 795 | 4 |
| 1-5 | 60 | 1228 | 4 | 1689 | 4 | 898 | 4 | 961 | 4 |

TABLE 2

HEAT SEAL TESTING - PVF/PRIMER/ADHESIVE/PRIMER/PVF
ADHESIVE = Blend of:
(1) 50% ethylene butene copolymer LLDPE
(2) 10% low density polyethylene
(3) 25% ethylene butene copolymer VLLDPE
(4) 15% high density polyethylene grafted with maleic anhydride

| | | Heat Seal Bar Temperature | | | | | | | |
|---|---|---|---|---|---|---|---|---|---|
| | | 180° C. | | 180° C. | | 200° C. | | 200° C. | |
| Sample # | Dwell Time (sec) | Dry (g/cm) | Failure (1–4) | Wet (g/cm) | Failure (1–4) | Dry (g/cm) | Failure (1–4) | Wet (g/cm) | Failure (1–4) |
| 2-1 | 5 | 843 | 4 | 374 | 1 | 1992 | 4 | 1154 | 1 |
| 2-2 | 15 | 740 | 4 | 1063 | 4 | 992 | 4 | 992 | 4 |
| 2-3 | 30 | 1303 | 4 | 1232 | 4 | 1217 | 4 | 894 | 4 |
| 2-4 | 45 | 516 | 4 | 850 | 1 | 886 | 4 | 1130 | 4 |
| 2-5 | 60 | 563 | 4 | 906 | 4 | 1248 | 4 | 1512 | 4 |

Example A

This is a comparison example with acid modified polyolefin adhesive and no primer: PVF/ADHESIVE/PVF.

The procedure used in this example is the same as described in Example 1 with the exception that no primer is used. A sandwich structure of PVF/adhesive/PVF is formed. Two different adhesives are used as reported separately in Tables 3 and 4 (same adhesives as in Tables 1 and 2, respectively).

Results are summarized in Tables 3 and 4 for samples which are either dry or wet, and vary in heat seal temperature and dwell time. The test data for samples with adhesive alone is sporadic. In general, the data shows that bonds with adhesive alone are weaker than the bonds of the invention (i.e., bonds with primer and adhesive). Bonds with adhesive alone are not capable of withstanding the soak test (18 hours at 80° C.) with the exception of some bonds formed using long dwell times. Bonds without both the primer and the adhesive will not survive exposure to moisture and humidity.

Example B

This is a comparison example with amine functional acrylic copolymer primer and no adhesive: PVF/PRIMER/THERMOPLASTIC.

Samples of PVF film are primed with an amine functional acrylic copolymer and applied to a thermoplastic substrate with no additional adhesive layer. The sandwich structure PVF/primer/thermoplastic film is subjected to heat sealing as described in Example 1. In this example the heat seal bars are operated at a temperature of 194° C., an air pressure of 60 psi (415 kPa) with a sealing pressure of 376 lbs (171 kg) on a 1 inch (2.5 cm) wide sample. Dry and wet bonds are characterized and reported in Table 5.

Bonds formed using primer alone are weak and not suitable for the applications of this invention.

TABLE 3

HEAT SEAL TESTING - PVF/ADHESIVE/PVF
ADHESIVE = Blend of:
(1) 64.7% copolymer of ethylene and 28% vinyl acetate
(2) 20% copolymer of ethylene and 28% vinyl acetate grafted with maleic anhydride
(3) 15% hydrocarbon tackifier
(4) 0.3% amide slip additive

| | | Heat Seal Bar Temperature | | | | | | | |
|---|---|---|---|---|---|---|---|---|---|
| | | 180° C. | | 180° C. | | 200° C. | | 200° C. | |
| Sample # | Dwell Time (sec) | Dry (g/cm) | Failure (1–4) | Wet (g/cm) | Failure (1–4) | Dry (g/cm) | Failure (1–4) | Wet (g/cm) | Failure (1–4) |
| 3-1 | 1 | 673 | 1 | 0 | 1 | 524 | 1 | 0 | 1 |
| 3-2 | 3 | 504 | 1 | 0 | 1 | 512 | 3 | 996 | 4 |
| 3-3 | 5 | 803 | 1 | 0 | 1 | 882 | 3 | 0 | 1 |
| 3-4 | 10 | 591 | 1 | 0 | 1 | 437 | 1 | 0 | 1 |
| 3-5 | 30 | 874 | 1 | 0 | 1 | 1059 | 4 | 0 | 1 |
| 3-6 | 60 | 1102 | 4 | 0 | 1 | 1067 | 4 | 917 | 3 |

TABLE 4

HEAT SEAL TESTING - PVF/ADHESIVE/PVF
ADHESIVE = Blend of:
(1) 50% ethylene butene copolymer LLDPE
(2) 10% low density polyethylene
(3) 25% ethylene butene copolymer VLLDPE
(4) 15% high density polyethylene grafted with maleic anhydride

| | | Heat Seal Bar Temperature | | | | | | | |
|---|---|---|---|---|---|---|---|---|---|
| | | 180° C. | | 180° C. | | 200° C. | | 200° C. | |
| Sample # | Dwell Time (sec) | Dry (g/cm) | Failure (1–4) | Wet (g/cm) | Failure (1–4) | Dry (g/cm) | Failure (1–4) | Wet (g/cm) | Failure (1–4) |
| 4-1 | 1 | 134 | 2 | 0 | 1 | 480 | 3 | 0 | 1 |
| 4-2 | 3 | 217 | 2 | 0 | 1 | 850 | 2 | 0 | 1 |
| 4-3 | 5 | 189 | 2 | 0 | 1 | 508 | 2 | 0 | 1 |
| 4-4 | 10 | 224 | 2 | 0 | 1 | 579 | 2 | 0 | 1 |
| 4-5 | 30 | 417 | 2 | 0 | 1 | 1079 | 2 | 0 | 1 |
| 4-6 | 60 | 992 | 3 | 504 | 2 | 551 | 2 | 508 | 4 |

TABLE 5

HEAT SEAL TESTING - PVF/PRIMER/THERMOPLASTIC

| Sample # | Film | Primer | Substrate | Substrate Thickness (mil) | Dry (g/cm) | Dry Failure (1–4) | Soak (g/cm) | Soak Failure (1–4) |
|---|---|---|---|---|---|---|---|---|
| 5-1 | PVF-1 | P1 | PP | 20 | 0 | 1 | 0 | 1 |
| 5-2 | PVF-1 | P2 | PP | 20 | 0 | 1 | 0 | 1 |
| 5-3 | PVF-1 | P1 | PE | 20 | 0 | 1 | 0 | 1 |
| 5-4 | PVF-1 | P2 | PE | 20 | 0 | 1 | 0 | 1 |

Example 2—Coextrusion PVF

As shown in Tables 6–11, a number of a fluoropolymer film/primer/adhesive/thermoplastic film laminate structures are prepared according to this invention and subjected to the bond strength test described above. The structures vary as to fluoropolymer film, primer, adhesive type and thickness, and thermoplastic film type and thickness.

All samples are prepared by applying an amine functional acrylic copolymer primer to a corona treated sheet of cast, PVF film by gravure coating and drying. An acid modified polyolefin adhesive is coextruded in conjunction with a thermoplastic resin onto a rolled sheet of the dry, primed PVF film while guiding the structure between a pressure roll and a primary chill roll and then over a secondary chill roll at a line speed of 15 ft (4.6 m)/minute. The primary chill roll and secondary chill roll are at a temperature of 120° F. (49° C.). Samples were tested for bond strength according to the method described above. The ratings as described above were used to characterize the bonds. Laminate structures having a dry/wet bond rating of 3/3 or better are suitable for commercial applications.

TABLE 6

COEXTRUSION - PVF/PRIMER/ADHESIVE/THERMOPLASTIC
ADHESIVE = Blend of:
(1) 64.7% copolymer of ethylene and 28% vinyl acetate
(2) 20% copolymer of ethylene and 28% vinyl acetate grafted with maleic anhydride
(3) 15% hydrocarbon tackifier
(4) 0.3% amide slip additive
MP = 74° C.
VICAT = 42° C.
MI = 10.9

| Sample # | Film | Primer | Adhesive Thickness mil(μm) | Substrate | Substrate Thickness mil(μm) | Dry Failure (1–4) | Wet Failure (1–4) |
|---|---|---|---|---|---|---|---|
| 6-1 | PVF-1 | P1 | 5(127) | PE | 15(381) | 4 | 4 |
| 6-2 | PVF-2 | P2 | 5(127) | PE | 15(381) | 3 | 3 |

TABLE 7

COEXTRUSION - PVF/PRIMER/ADHESIVE/THERMOPLASTIC
ADHESIVE = Blend of
(1) 92% copolymer of ethylene and 25% vinyl acetate
(2) 8% copolymer of ethylene and 28% vinyl acetate grafted with maleic anhydride
MP = 80° C.
VICAT = 56° C.
MI = 2.0

| Sample # | Film | Primer | Adhesive Thickness mil(μm) | Substrate | Substrate Thickness mil(μm) | Dry Failure (1–4) | Wet Failure (1–4) |
|---|---|---|---|---|---|---|---|
| 7-1 | PVF-1 | P1 | 5(127) | PP | 15(381) | 4 | 4 |
| 7-2 | PVF-2 | P2 | 5(127) | PP | 15(381) | 2 | 4 |

TABLE 8

COEXTRUSION - PVF/PRIMER/ADHESIVE/THERMOPLASTIC
ADHESIVE: = Blend of:
(1) 90% copolymer of ethylene and 22% methyl acrylate
(2) 10% copolymer of ethylene and 22% methyl acrylate grafted with maleic anhydride
MP = 82° C.
VICAT = 55° C.
MI = 6.5

| Sample # | Film | Primer | Adhesive Thickness mil(μm) | Substrate | Substrate Thickness mil(μm) | Dry Failure (1–4) | Wet Failure (1–4) |
|---|---|---|---|---|---|---|---|
| 8-1 | PVF-1 | P1 | 5(127) | PP | 15(381) | 4 | 4 |
| 8-2 | PVF-2 | P2 | 5(127) | PP | 15(381) | 2 | 4 |

TABLE 9

COEXTRUSION - PVF/PRIMER/ADHESIVE/THERMOPLASTIC
ADHESIVE = Blend of:
(1) 50% ethylene butene copolymer LLDPE
(2) 10% low density polyethylene
(3) 25% ethylene butene copolymer VLLDPE
(4) 15% high density polyethylene grafted with maleic anhydride
MP = 127° C.
VICAT = 93° C.
MI = 3.0

| Sample # | Film | Primer | Adhesive Thickness mil(μm) | Substrate | Substrate Thickness mil(μm) | Dry Failure (1–4) | Wet Failure (1–4) |
|---|---|---|---|---|---|---|---|
| 9-1 | PVF-1 | P1 | 5(127) | PE | 15(381) | 4 | 3 |

TABLE 10

COEXTRUSION - PVF/PRIMER/ADHESIVE/THERMOPLASTIC
ADHESIVE = Blend of:
(1) 24% ethylene octene copolymer LLDPE
(2) 18% ethylene propylene diene copolymer EPDM
(3) 10% low density polyethylene
(4) 13% ethylene butene copolymer VLLDPE
(5) 35% ethylene butene copolymer LLDPE grafted with maleic anhydride
MP = 121° C.
VICAT = 86° C.
MI = 1.1

| Sample # | Film | Primer | Adhesive Thickness mil(μm) | Substrate | Substrate Thickness mil(μm) | Dry Failure (1–4) | Wet Failure (1–4) |
|---|---|---|---|---|---|---|---|
| 10-1 | PVF-1 | P1 | 5(127) | PP | 15(381) | 4 | 3 |
| 10-2 | PVF-2[1] | P1 | 5(127) | PP | 15(381) | 3 | 3 |
| 10-3 | PVF-2[2] | P2 | 5(127) | PP | 15(381) | 3 | 4 |

[1] = 450° C. Bynel ® Melt
[2] = 550° C. Bynel ® Melt

TABLE 11

COEXTRUSION - PVF/PRIMER/ADHESIVE/THERMOPLASTIC

| Sample # | Film | Primer | Adhesive | Adhesive Thickness mil(μm) | Substrate | Substrate Thickness mil(μm) | Dry (g/cm) | Dry Failure (1–4) | Wet (g/cm) | Wet Failure (1–4) |
|---|---|---|---|---|---|---|---|---|---|---|
| 11-1 | PVF-1 | none | A1 | 1(25.4) | PE | 20(508) | 563 | 3 | 118 | 1 |
| 11-2 | PVF-1 | P1 | A1 | 5(127) | PE | 15(381) | 1445 | 4 | 1095 | 3 |
| 11-3 | PVF-1 | none | A2 | 1(25.4) | PE | 20(508) | 79 | 1 | 9 | 1 |
| 11-4 | PVF-1 | P1 | A2 | 5(127) | PE | 15(381) | 1627 | 4 | 1948 | 3 |
| 11-5 | PVF-1 | none | A3 | 5(127) | PP | 15(381) | 95 | 1 | 9 | 1 |
| 11-6 | PVF-1 | P1 | A3 | 5(127) | PP | 15(381) | 1570 | 4 | 1539 | 4 |
| 11-7 | PVF-3 | P1 | A3 | 5(127) | N-1 | 15(381) | 1479 | 4 | 1231 | 3 |
| 11-8 | PVF-3 | P1 | A3 | 5(127) | N-2 | 15(381) | 1511 | 4 | 1394 | 3 |
| 11-9 | PVF-3 | P1 | A4 | 5(127) | PT | 15(381) | 1461 | 4 | 1589 | 4 |

TABLE 11-continued

COEXTRUSION - PVF/PRIMER/ADHESIVE/THERMOPLASTIC

| Sample # | Film | Primer | Adhesive | Adhesive Thickness mil(μm) | Substrate | Substrate Thickness mil(μm) | Dry (g/cm) | Dry Failure (1–4) | Wet (g/cm) | Wet Failure (1–4) |
|---|---|---|---|---|---|---|---|---|---|---|

A1 ADHESIVE = Blend of:
(1) 64.7% copolymer of ethylene and 28% vinyl acetate
(2) 20% copolymer of ethylene and 28% vinyl acetate grafted with maleic anhydride
(3) 15% hydrocarbon tackifier
(4) 0.3% amide slip additive
MP = 74° C., VICAT = 42° C., MI = 10.9
A2 ADHESIVE = Blend of:
(1) 50% ethylene butene copolymer LLDPE
(2) 10% low density polyethylene
(3) 25% ethylene butene copolymer VLLDPE
(4) 15% high density polyethylene grafted with maleic anhydride
MP = 127° C., VICAT = 93° C., MI = 3.0
A3 ADHESIVE = Blend of:
(1) 24% ethylene octene copolymer LLDPE
(2) 18% ethylene propylene diene copolymer EPDM
(3) 10% low density polyethylene
(4) 13% ethylene butene copolymer VLLDPE
(5) 35% ethylene butene copolymer LLDPE grafted with maleic anhydride
MP = 121° C., VICAT = 86° C., MI = 1.1
A4 ADHESIVE = Blend of:
(1) 90% copolymer of ethylene and 22% methyl acrylate
(2) 10% copolymer of ethylene and 22% methyl acrylate grafted with maleic anhydride
MP = 82° C., VICAT = 55° C., MI = 6.5

Example 3—Coextrusin PVDF

Similar to Example 2, fluoropolymer film/primer/adhesive/thermoplastic film laminate structures are prepared according to this invention using polyvinylidene fluoride as a fluoropolymer film and nylon as a substrate. The results of subjecting the laminate structures to the bond strength tests are presented in Table 12.

Sample 12-1 is prepared by applying an amine functional acrylic copolymer primer to a corona treated sheet of cast, PVDF film by gravure coating and drying. An acid modified polyolefin adhesive is coextruded in conjunction with a thermoplastic resin onto a rolled sheet of the dry, primed PVDF film while guiding the structure between a pressure roll and a primary chill roll and then over a secondary chill roll at a line speed of 15 ft (4.6 m)/minute. The primary chill roll and secondary chill roll are at a temperature of 120° F. (49° C.). In the case of sample 12-2, no primer is applied. In the case of 12-3, no adhesive is applied.

Samples are tested for bond strength according to the method described above. The ratings as described above were used to characterize the bonds. Laminate structures having a dry/wet bond rating of 3/3 or better are suitable for commercial applications. Only the laminate structure prepared with both the primer and acid modified polyolefin adhesive achieved a satisfactory dry/wet bond rating.

TABLE 12

COEXTRUSION - PVDF/PRIMER/ADHESIVE/THERMOPLASTIC

| Sample # | Film | Primer | Adhesive | Adhesive Thickness mil(μm) | Substrate | Substrate Thickness mil(μm) | Dry (g/cm) | Dry Failure (1–4) | Wet (g/cm) | Wet Failure (1–4) |
|---|---|---|---|---|---|---|---|---|---|---|
| 12-1 | PVDF | P1 | A3 | 5(127) | N-1 | 15(381) | 1403 | 4 | 1187 | 3 |
| 12-2 | PVDF | None | A3 | 5(127) | N-1 | 15(381) | 5 | 1 | 0 | 1 |
| 12-3 | PVDF | None | None | 0 | N-1 | 15(381) | 2 | 1 | 0 | 1 |

A3 ADHESIVE = Blend of:
(1) 24% ethylene octene copolymer LLDPE
(2) 18% ethylene propylene diene copolymer EPDM
(3) 10% low density polyethylene
(4) 13% ethylene butene copolymer VLLDPE
(5) 35% ethylene butene copolymer LLDPE grafted with maleic anhydride
MP = 121° C., VICAT = 86° C., MI = 1.1

Example 4—Weathering Performance

Weathering performance of film structures and laminates made from film structures of this invention are presented in Tables 13A (Before Weathering) and 13B (After Weathering). The structures are prepared similarly to the method described in Example 2.

Sample 13-2 is a laminate film structure prepared by applying an amine functional acrylic copolymer primer to a corona treated sheet of cast, PVF film by gravure coating and drying. An acid modified polyolefin adhesive is coextruded in conjunction with a thermoplastic resin onto a rolled sheet of the dry, primed PVF film while guiding the structure between a pressure roll and a primary chill roll and then over a secondary chill roll at a line speed of 15 ft (4.6 m)/minute. The primary chill roll and secondary chill roll are at a temperature of 120° F. (49° C.). In the case of samples 13-1 and 13-3, film structures without a substrate are prepared.

The samples are subjected to bond strength tests before and after accelerated weathering according to SAE J1960 as described previously. Before weathering, bond strength of laminated film structures is measured in accordance with ASTM D1876-93 as in the prior examples. After weathering, bond strength of laminated film structures is determined by subjecting the laminate to ASTM D3808-92. The relative humidity of the room is not controlled and the temperature of the room is maintained at 70°±5° F. (21°±3° C.). Three tests are conducted on each laminate. A scalpel is used to cut four parallel lines two inches (5 cm) in length and ⅛ inch (0.3 cm) between cuts in the PVF surface of the laminate. The scalpel is then used to separate approximately ¼ inch (0.6 cm) of the PVF film from the laminate to create a pull tab. The PVF film is pulled manually at an angle of approximately 90°. The ratings as described previously are used to characterize the bonds. Samples all had excellent bonds before and after weathering. Bond strengths after weathering are characterized at 1200, 2400, 3600, and 4800 kilojoules energy. Even after 4800 kilojoules (equated to approximately 4 years exposure in Florida facing south at 45°), the bonds retain a rating of 4.

TABLE 13A

LAMINATE STRUCTURES BEFORE WEATHERING

| Sample # | Film | Primer | Adhesive | Adhesive Thickness mil(μm) | Substrate | Substrate Thickness mil(μm) | Dry (g/cm) | Dry Failure (1–4) | Wet (g/cm) | Wet Failure (1–4) |
|---|---|---|---|---|---|---|---|---|---|---|
| 13-1 | PVF-3 | P1 | A3 | 20(508) | None | 0 | 1556 | 4 | 1499 | 4 |
| 13-2 | PVF-3 | P1 | A3 | 5(127) | PP | 15(381) | 1467 | 4 | 1523 | 4 |
| 13-3 | PVF-3 | P1 | A5 | 20(508) | None | 0 | 1618 | 4 | 1587 | 4 |

A3 ADHESIVE = Blend of:
(1) 24% ethylene octene copolymer LLDPE
(2) 18% ethylene propylene diene copolymer EPDM
(3) 10% low density polyethylene
(4) 13% ethylene butene copolymer VLLDPE
(5) 35% ethylene butene copolymer LLDPE grafted with maleic anhydride
MP = 121° C., VICAT = 86° C., MI = 1.1

A5 ADHESIVE=Blend of
(1) 92% copolymer of ethylene and 25% vinyl acetate
(2) 8% copolymer of ethylene and 28% vinyl acetate grafted with maleic anhydride
MP=80° C., VICAT=56° C., MI=2.0

TABLE 13B

BOND STRENGTH AFTER WEATHERING

| Sample # | 1200KJ Failure (1–4) | 2400KJ Failure (1–4) | 3600KJ Failure (1–4) | 4800KJ Failure (1–4) |
|---|---|---|---|---|
| 13-1 | 4 | 4 | 4 | 4 |
| 13-2 | 4 | 4 | 4 | 4 |
| 13-3 | 4 | 4 | 4 | 4 |

What is claimed is:

1. A process for making a laminated film structure comprising:
    depositing an amine functional acrylic polymer on a fluoropolymer film to form a primed fluoropolymer film;
    forming a layer of thermoplastic adhesive and adhering said layer to said amine functional acrylic polymer of said primed fluoropolymer film, said thermoplastic adhesive containing an acid modified polyolefin;
    forming a thermoplastic substrate and adhering said substrate to said layer of thermoplastic adhesive;
    wherein said layer of thermoplastic adhesive is formed and adhered to said amine functional acrylic polymer of said primed fluoropolymer film by extrusion onto said primed fluoropolymer film.

2. The process of claim 1 wherein said thermoplastic substrate is formed and adhered to said layer of thermoplastic adhesive by extrusion onto said layer of thermoplastic adhesive on said primed fluoropolymer film.

3. The process of claim 1 wherein said layer of thermoplastic adhesive and said thermoplastic substrate are formed and adhered by coextrusion onto said primed fluoropolymer film.

4. The process for making the laminated film structure of claim 1 wherein said acid modified polyolefin is selected from the group consisting of (1) copolymers of ethylene and at least one first comonomer of unsaturated carboxylic acid or derivative of said acid, (2) olefin polymer grafted with at least one unsaturated carboxylic acid or derivative of said acid, and (3) blends of said copolymers and said grafted olefin polymers.

5. The process for making the laminated film structure of claim 4 wherein said copolymers of ethylene and at least one first comonomer of unsaturated carboxylic acid or derivative of said acid further comprise at least one second comonomer selected from the group consisting of alkyl esters of α,β-ethylenically unsaturated carboxylic acid, vinyl esters of carboxylic acid and carbon monoxide.

6. The process for making the laminated film structure of claim 1 wherein said fluoropolymer film has a surface-activated surface and said amine functional acrylic polymer is deposited on said surface-activated surface.

7. The process for making the laminated film structure of claim 1 wherein said thermoplastic substrate is selected from the group consisting of polyolefin, polyester and polyamide.

8. The process for making the laminated film structure of claim 1 wherein said fluoropolymer film is selected from the group consisting of polyvinyl fluoride films, polyvinylidene fluoride films and films from a blend of polyvinylidene fluoride and acrylic polymers.

9. The process for making the laminated film structure of claim 1 wherein said fluoropolymer film is a polyvinyl fluoride film.

* * * * *